(12) United States Patent
Batista

(10) Patent No.: US 7,407,581 B2
(45) Date of Patent: Aug. 5, 2008

(54) BIODEGRADATION OF OXYANIONS SUCH AS PERCHLORATE ON ION EXCHANGE RESINS

(75) Inventor: Jacimaria R. Batista, Las Vegas, NV (US)

(73) Assignee: Basin Water, Inc., Rancho Cucamonga, CA (US)

(*) Notice: Subject to any disclaimer, the term of this patent is extended or adjusted under 35 U.S.C. 154(b) by 0 days.

(21) Appl. No.: 11/747,823

(22) Filed: May 11, 2007

(65) Prior Publication Data

US 2007/0272615 A1   Nov. 29, 2007

Related U.S. Application Data

(60) Provisional application No. 60/808,082, filed on May 23, 2006.

(51) Int. Cl.
  *C02F 3/00*   (2006.01)
  *B01D 29/00*   (2006.01)
(52) U.S. Cl. .......... 210/606; 210/610; 210/611; 210/615; 210/616; 210/617; 210/618; 210/670
(58) Field of Classification Search .......... 210/606, 210/610, 611, 615–618, 670
See application file for complete search history.

(56) References Cited

U.S. PATENT DOCUMENTS

| | | | |
|---|---|---|---|
| 3,755,156 A | 8/1973 | Yakovelev et al. | |
| 4,659,476 A | 4/1987 | Burriat et al. | |
| 5,302,285 A | 4/1994 | Attaway et al. | |
| 6,066,257 A | 5/2000 | Venkatesh et al. | |
| 6,077,432 A | 6/2000 | Coppola et al. | |
| 6,191,176 B1* | 2/2001 | Tadros et al. | 521/48 |
| 6,358,396 B1 | 3/2002 | Gu et al. | |
| 6,407,143 B1 | 6/2002 | Even et al. | |
| 6,423,533 B1 | 7/2002 | Gearheart et al. | |
| 7,311,843 B2* | 12/2007 | Solomon et al. | 210/670 |
| 2001/0019030 A1 | 9/2001 | Satyanarayana et al. | |
| 2002/0132866 A1 | 9/2002 | Even et al. | |
| 2003/0222031 A1 | 12/2003 | Gu et al. | |
| 2007/0043513 A1* | 2/2007 | Vandecasteele | 702/20 |

FOREIGN PATENT DOCUMENTS

DE   199 34 409   1/2001

OTHER PUBLICATIONS

Rikken et al. "Transformation of (per)chlorate into chloride by a newly isolated bacterium: reduction and dismutation" *Appl. Microbial. Biotechnol* 45:420-426 (1996).

Gingras et al. "Biological reduction of perchlorate in ion exchange regenerant solutions containing high salinity and ammonium levels" *J. Environ. Monit.* 4:96-101 (2002).

(Continued)

*Primary Examiner*—Chester T Barry
(74) *Attorney, Agent, or Firm*—Foley & Lardner LLP

(57) ABSTRACT

Improved systems and methods for removing the load of perchlorate and other oxyanions off of ion exchange resins through bioregeneration are disclosed. The improved systems and methods rely upon direct contact between the resin and a liquid product containing enrichment cultures of or pure strains of perchlorate-destroying microorganisms. Controlled temperatures also lead to improvements as do upflow conditions leading to bed expansion. These methods can be incorporated into methods for removing perchlorate from aqueous streams.

25 Claims, 7 Drawing Sheets

OTHER PUBLICATIONS

Bruce et al. "Reduction of (per)chlorate by a novel organism isolated from paper mill waste" *Environ Microbial* 1(4):319-329 (1999).

Logan, et al. "Kinetics of Perchlorate- and Chlorate-Respiring Bacteria" *Appl. Environ. Microbial* 67(6):2499-2506 (2001).

Logan, Bruce E. "Assessing the outlook for perchlorate remediation" *Environmental Science & Technology* 35:23 (2001).

Xu et al. "Microbial Degradation of Perchlorate: Principles and Applications" *Env. Engineer. Science* 20:405-422 (2003).

* cited by examiner

BIODEGRADATION OF OXYANIONS SUCH AS PERCHLORATE ON ION EXCHANGE RESINS

CROSS-REFERENCE TO RELATED PATENT APPLICATIONS

This application claims priority from U.S. Provisional Application Ser. No. 60/808,082, filed May 23, 2006, incorporated herein by reference in its entirety.

BACKGROUND OF THE INVENTION

1. Field of the Invention

This invention pertains to the field of water treatment and to the use of ion (anion) exchange resins in processes to remove oxyanion contaminants, such as perchlorate ion contaminants, from aqueous streams. These aqueous streams range from domestic, industrial and agricultural water supplies such as drinking water to waste waters, brines and other aqueous flows. More particularly, in preferred embodiments, this invention relates to improvements in methods for biologically removing perchlorate load from perchlorate-loaded ion exchange resins generated in such processes so as to permit reuse or safe disposal of the resins.

2. Background Information

Ammonium perchlorate has been used for the past 50 years as an oxidizer component in solid explosives and solid propellants for rockets, missiles and fireworks. It is estimated that well over 90% of the ammonium perchlorate produced in the United States is used in these applications. Casual handling of perchlorates and perchlorate-laden effluents by manufacturers and the build up of poorly-contained stockpiles of outdated missile and rocket fuels have resulted in perchlorate contamination of surface water and ground water supplies. Perchlorate contamination has been detected in most states of the United States (Urbansky, Urbanksy, E. T. 1998-*Bioremediation Journal*, 2, 81-95) and in Europe as well. It is particularly critical in the Western region of the United States.

Recently, the National Academy of Sciences (NAS) has evaluated the existing toxicological information on perchlorate and has recommended a reference dose (RfD) for perchlorate that corresponds to a Drinking Water Equivalent Level (DWEL), of 24.5 µg/L (USEPA, 2005 http://www.epa.gov/perchlorate, last reviewed: Feb. 22, 2005).

The California Department of Health Services has established an action level for perchlorate of 6 ug/l. This is based upon the potential for perchlorate to inhibit the uptake of iodine by the thyroid gland. Perchlorate levels of up to several hundred ug/l have been found in ground water in California and other states.

Two approaches to removing perchlorate from water supplies are being researched extensively—biological destruction (see Logan et al. (2001) *Applied and Environ. Microbiology*, 2499-2506, Hatzinger et al. (2000) *In: Case Studies in the Remediation of Chlorinated and Recalcitrant Compounds*, Battelle Press, 115-122, Liu, J. and J. Batista (2000). In: *Bioremediation of Inorganic Contaminants*, Battelle Press (6) 9: 265-273, Herman, D. and Frankenberger (1999) *Journal of Environmental Quality*, 28:10-18-1024, Kim K. and B. Logan (2001) *Water Research*, 35:3071-3076) and ion exchange (Gu et al. (2000) *Environmental Science and Technology*, 34:1075-1080, Batista et al., (2000), *In: Perchlorate in the Environment*, Kluwer Plenum, 13:135-145, Tripp, A. and D. Clifford, 2000, *In: Perchlorate in the Environment*, Kluwer Plenum, 12:123-134, Guter, G. (2000) *In: Perchlorate in the Environment*, Kluwer Plenum, 11:109-122, (Gu et al. (2001) *Environmental Science and Technology*, 35:3363-3368.

Biological destruction using various bacterial strains has been described at the Federal Remediation Technologies Roundtable General Meeting held on May 30, 2001 where Jeffrey Marqusee described how biological organisms could attack perchlorate in subsurface environments. Similar studies were also reported at that meting by Paul Hatzinger (Poster Number 43) and by John D. Coates (Poster Cleanup CU 45).

Ion exchange is an attractive method for removing perchlorate from water sources because perchlorate has a very high affinity for both polystyrene and acrylic-based strong base anion exchange resins. However, state of the art practice does not provide a practical and convenient method for regeneration of the resin after it has been used. This is due at least in part to perchlorate's affinity for the common resins being so strong that very large quantities of concentrated sodium chloride brine are required to displace the perchlorate during regeneration. Several hundred pounds of sodium chloride regenerant per cubic foot of resin at salt concentrations of from 6% to saturation are typically used.

These regeneration difficulties have led to an alternative ion exchange process in which the resin is used once for the adsorption of perchlorate and other oxyanions (i.e. nitrate, arsenate, sulfate) and then thrown away instead of being regenerated and reused.

In both of these processes of the prior art, a difficult-to-deal-with perchlorate-loaded spent resin is formed. The loaded resin can not be safely discarded in ordinary land fills and the like because of fears of its perchlorate content reentering the environment.

Attempts to bacterially break down the perchlorate content of the concentrated sodium chloride brines formed in conventional regeneration of perchlorate-loaded resins have been unsuccessful. This is because the bacteria are generally inactivated or killed by the high salt levels. High salt levels create an osmotic imbalance in cells containing normal levels of cytoplasmic solutes. This imbalance leads to a loss of water from the bacteria cells and an irreversible retraction of the cytoplasm, which is the cause for the rapid killing of microorganisms which are not salt-tolerant by nature. There have been several reports of negative effects of salinity on the biological reduction of perchlorate when salt concentrations exceed 3% (Gingras and Batista, 2002. *J. Env. Monit.*, 4:96-101; Okeke et al., (2002). *Env. Pollution*, 118:357-63; Logan et al. (2001)., *Water Research*, 35:3034-3038). Gingras and Batista, supra, reported that as little as 0.5% sodium chloride present in a bioremediation environment lowered perchlorate degradation activity by 30% while 1.0% sodium chloride reduced activity by 60%.

In 2003, it was recognized by Gerald A. Guter and coworkers at Basin Water, Inc. that what was needed was a process for removing perchlorate from perchlorate-loaded ion exchange resins that did not involve the generation of large amounts of intractable perchlorate-rich regeneration products. Their PCT patent application number PCT/US2004/021467 disclosed a new biological process for removing perchlorate load from spent ion exchange resins that had been employed in perchlorate remediation settings. It also described an overall integrated ion exchange process for removing perchlorate contamination from water sources and regenerating the used ion exchange resin by biologically removing perchlorate load from it. While their processes, which involved biologically treating the perchlorate-loaded resin itself to directly break down the perchlorate load to nonperchlorate species such as chloride that pose reduced environmental burdens, was a significant advance, further studies have now shown that these processes can be improved in various manners to increase their efficiency and performance.

What is needed, and what this invention provides, are improved ion exchange processes for removing perchlorate from perchlorate-contaminated aqueous streams as well as improved biological processes for removing perchlorate load from used perchlorate-removing ion exchange resins which do not generate large quantities of intractable regeneration products. Furthermore, this invention provides new processes wherein exchange resin loading with perchlorate and biological regenerating of the resin to remove the resulting perchlorate load can occur concomitantly.

STATEMENT OF THE INVENTION

Improvements have now been made to the processes by which perchlorate load present on a perchlorate-loaded ion exchange resin can be reduced, and in some cases virtually completely eliminated, by contacting the loaded resin in situ with a perchlorate-destroying microbial fluid product. This perchlorate-destroying microbial fluid product can be a suspension of perchlorate-destroying microorganisms. It also can be a supernatant or enzymatic extract obtained from such a suspension.

One improvement involves employing a perchlorate-destroying microbial fluid product that is based on an enriched culture of perchlorate-destroying microorganisms.

Another improvement involves employing a perchlorate-destroying microbial fluid product that is based on one or more of the following perchlorate and/or other oxyanions-destroying microorganisms, optionally without enrichment but preferably with enrichment:

α, β, and γ subclasses of proteobacteria;
*Dechloromonas agitata;*
*Dechloromonas* SUIL;
*Dechloromonas* Miss;
*Dechloromonas* NM;
*Dechloromonas* JM;
*Dechloromonas* HZ;
*Dechloromonas* JDS5;
*Dichlorosoma suillum;*
*Dichlorosoma* PS;
*Dichlorosoma* SDGM,
*Dichlorosoma* KJ, ;
*Dichlorosoma* GR-1;
*Dichlorosoma* PDX,
*Dichlorosoma perc lace;*
*Dichlorosoma* DPA;
*Dichlorosoma* D8;
*Dichlorosoma* KJ;
*Dichlorosoma* KJ4;
*Pseudomonas stenotrophomonas;*
*Vibrio dechloraticans Cuznesove* B-1168;
*Wohinella succinogenes* HAP-1;
*Ideonella dechloratans*; and
*Acinetobacter thermotoleranticus.*

It will be appreciated by those of skill in the art that some of these microorganisms and the fluid products based upon them are capable of reducing nitrate and other oxyanions. This is advantageous, as well.

Another improvement to these processes involves carrying out the contacting of the perchlorate-loaded spent ion exchange resin with the perchlorate-destroying microbial fluid at a temperature of from about 5° C. to about 30° C.

Yet a fourth improvement to these processes involves carrying out the contacting of the perchlorate-loaded spent ion exchange resin with the perchlorate-destroying microbial fluid in a vertical resin bed configuration with the flow of fluid being upflow through the resin bed, and preferably with the flow of fluid being at a velocity such that the bed of resin is expanded by the fluid flow.

In additional aspects, the processes can be further improved by employing two or more or all or these four improvements.

Thus, in one overall aspect, this invention involves employing any or all of these four improvements in a general method for reducing the level of perchlorate load on perchlorate-loaded ion exchange resin by bioregeneration. This general method to which these improvements are applied includes the steps of obtaining perchlorate-loaded ion exchange resin and directly contacting the perchlorate-loaded ion exchange resin with a perchlorate-destroying microbial fluid product under conditions leading to conversion of the perchlorate load on the resin to nonperchlorate reaction products. These conditions are most commonly referred to as anaerobic/anoxic conditions and allow for the biologic reduction of perchlorate to nonperchlorate reaction products. The nonperchlorate reaction products include one or more of chlorate, chlorite, hypochlorite and chloride. This gives rise to a treated ion exchange resin having reduced perchlorate load relative to the perchlorate-loaded ion exchange resin. The nonperchlorate reaction products are less tightly bound to the ion exchange resin than was the original perchlorate and thus may be more easily rinsed or eluted from the resin to provide a bioregenerated resin suitable for reuse.

This advantageously-improved process can be used in a variety of settings including not only settings in which the treated ion exchange resin is recovered and recycled for reuse but also settings in which the treated ion exchange resin is more safely disposed of by reason of its reduced perchlorate load.

In another aspect any or all of the four improvements of this invention can be embodied as a method for safely disposing of perchlorate-loaded ion exchange resin This embodiment involves obtaining perchlorate-loaded ion exchange resin, and, prior to disposal, directly contacting the perchlorate-loaded ion exchange resin with a perchlorate-destroying microorganism fluid product under the improved conditions of this invention leading to conversion of perchlorate load on the resin to nonperchlorate reaction products and generation of treated ion exchange resin having reduced perchlorate load relative to the perchlorate-loaded ion exchange resin. After the perchlorate level in the resin as been reduced to a safe level, the treated ion exchange resin is disposed of.

The improvements of this invention can also be embodied as part of overall processes for treating perchlorate-contaminated water. In such processes, perchlorate-contaminated feed water is obtained and then contacted with an anion exchange resin having an affinity for perchlorate thereby forming a reduced perchlorate content product water and perchlorate-loaded ion exchange resin. The perchlorate-loaded ion exchange resin and the reduced perchlorate content product water are separated and the product water is put to use as a water source for domestic, industrial or agricultural applications including use as drinking water. The perchlorate-loaded ion exchange resin is then contacted with a perchlorate-destroying microbial fluid product under the improved conditions of this invention leading to improved conversion of perchlorate load on the resin to nonperchlorate reaction products and generation of treated ion exchange resin having reduced perchlorate load relative to the perchlorate-loaded ion exchange resin. The treated ion exchange resin can then be safely disposed of or can be rinsed and returned to use treating perchlorate-contaminated feed water.

The four improvements of this invention can also provide a process to reduce the levels of perchlorate and other oxyanions in brines. In this overall process in which the improvements are employed the feed water is contacted with a first anion exchange resin having an affinity for perchlorate and other oxyanions (i.e. nitrate and sulfate ) thereby removing perchlorate, nitrate and sulfate from the feed water and forming a reduced perchlorate, nitrate and sulfate content product water and a perchlorate, nitrate and sulfate-loaded first ion exchange resin. The product water is separated from the perchlorate, nitrate and sulfate-loaded first ion exchange resin. The perchlorate, nitrate and sulfate-loaded first ion exchange resin is regenerated by contact with sodium/potassium chloride (NaCl or KCl) regenerant brine, under conditions leading to the displacement of the perchlorate, nitrate and sulfate ions off of the resin into the waste brine. This yields a perchlorate, nitrate and sulfate-loaded waste brine that contains chloride. It also yields a regenerated first ion exchange resin. The perchlorate, nitrate and sulfate-contaminated waste brine and the regenerated first resin are separated and the first resin can be rinsed and reused, if desired.

In this process the separated waste brine is then contacted with a second anion exchange resin having an affinity and selectivity for perchlorate and other oxyanions such as nitrate. This leads to removal of the perchlorate and oxyanions from the waste brine and formation of a reduced perchlorate content treated waste brine and a perchlorate-loaded second ion exchange resin. This reduced perchlorate-content waste brine typically has a low enough perchlorate content to be suitably discharged into a disposal well or brine line. The perchlorate-loaded second ion exchange resin is then directly contacted with a perchlorate-destroying microbial fluid product under the improved conditions of this invention leading to conversion of perchlorate load on the resin to nonperchlorate reaction products and generation of treated second ion exchange resin having reduced perchlorate load relative to the perchlorate-loaded second ion exchange resin. This second resin can be reused in the manner just described.

In additional aspects, this invention provides equipment and systems for carrying out these improved methods and processes. For example the improvements of this invention can be embodied as a system for treating a perchlorate-loaded ion exchange resin to reduce its perchlorate load to the point that it can be recycled and reused or to a point that it can be safely disposed of. Such a system includes a first reaction vessel containing a culture comprising a perchlorate/oxyanions-destroying microorganisms, an aqueous medium, and nutrients for the microorganisms. This first vessel is maintained at conditions promoting the growth and enrichment of the perchlorate/oxyanions-destroying microorganisms and preferably microorganisms selected from the microorganisms listed as improvements hereinabove. The system also includes a second reaction vessel containing perchlorate/oxyanion-loaded anion exchange resin, as well as means for recovering the perchlorate-destroying microbial fluid product from the first vessel and means for feeding the recovered perchlorate-destroying microbial fluid product to the second vessel into contact with the perchlorate/oxyanion-loaded anion exchange resin. This second vessel is preferably operated at the temperature and bed-expansion conditions of this invention under which the perchlorate-destroying microbial fluid product reacts with the perchlorate load present on the perchlorate/oxyanion-loaded anion exchange resin and converts perchlorate/oxyanions to innocuous products thereby producing a reduced perchlorate/oxyanion-load anion exchange resin. This system will also include either or both of means for discarding the reduced perchlorate-load resin and means for rinsing and recovering the reduced-perchlorate-load resin for recycle and reuse.

BRIEF DESCRIPTION OF THE DRAWINGS

This invention will be further described with reference being made to the accompanying drawings in which

FIG. 1 shows a basic system to which the improvements of this invention may be applied in which the microbial fluid product culture is a suspension of microorganisms;

FIG. 2 shows a system to which the improvements of this invention may be applied in which the microbial fluid product is a liquid phase separated from the suspension of microorganisms;

FIG. 3 shows the system of FIG. 2 with several additional features incorporated into its flow scheme; and FIG. 4 shows the system of FIG. 2 adapted to treat a perchlorate-laden brine stream feed FIGS. 5 and 6 show two representative systems employing the improvements of this invention and in particular, an upflow bioregeneration scheme with bed expansion.

FIG. 7 is a graph of results obtained in the Examples which show the reduction of perchlorate load on a representative spent resin treated by the improved bioregeneration process described above.

FIG. 8 is a graph showing the retention in resin capacity following regeneration in accord with this invention.

FIGS. 9 and 10 are graphs showing the effects of flow rate and bed expansion on regeneration performance.

FIG. 11 is a graph showing the degree of bed expansion as a function of fluid flow rate.

DESCRIPTION OF PREFERRED EMBODIMENTS

Figure 1:
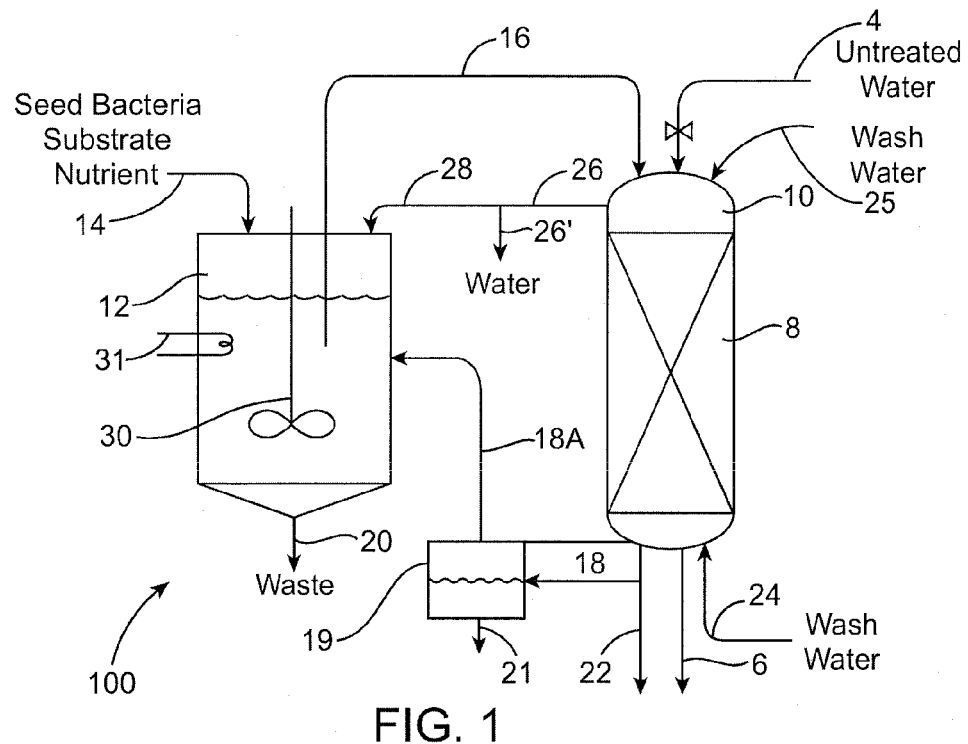
FIGS. 1 through 6 are semi cross-sectional schematic elevational views of representative systems embodying the improvements of this invention and FIGS. 7 through 11 are graphs illustrating the improved results achieved with the improvements of the present invention.

This description of preferred embodiments contains the following sections:

The Ion Exchange Resins—where representative resins treated by the improved processes are described.

The Perchlorate/Oxyanion-Destroying Microbes—where representative microorganisms giving rise to improved perchlorate-destroying microbial fluid products are described.

Representative Loaded Resins and Water-based Feedstocks—where representative loaded resins and water-based feedstocks, which include perchlorate-contaminated water streams and brines, and which are the source of the perchlorate load being destroyed on the resins, are described.

Overall Process Descriptions and Process Flows—where the process conditions used to effect the improvements of the present invention are described These sections will then be followed by Examples The Ion Exchange Resins The ion exchange resins which are loaded with perchlorate/oxyanions and treated in accord with the improvements of this invention are generally classed as strong and weak base anionic resins.

These resins are based on various polymer structures such as polystyrene and acrylic polymers with cross-linkers and bound to appropriate ion-binding active groups such as primary amines, secondary amines, tertiary amines, and quaternary ammonium groups. In these active groups the secondary, and tertiary amine groups and in the quaternary ammonium groups include one, two or three substituents which are commonly lower alkyl groups of from about 1 to about 6 carbon atoms, with or without substitution.

Representative resins include:
Prolate Strong Base Resins Type 1 and Type 2
Amberlite IRA-400
Amberlite IRA-900
Dowex SBR
Ionac ASB-1
Ionac AFP-100
Dowex SBR-P
Dowex 11
Duolite A-102-D
Ionac ASB-2
Amberlite IRA-93
Amberlite IR-45
Purolite A-400
Purolite A-520-E
Purolite A-600
Purolite 530-E
Purolite 600-E
Purolite A-850-E
Ionac A-260
Dowex WGR
Sybron SR6
Sybron SR7
Reillex™HPQ Resins (based on polyvinyl pyridine polymers)
Nitrex
Resintech SIR 100
Resintech SIR 110
Rohm and Haas Acrylic Resins Other ion exchange resins which are applicable to the invention are strong acid or weak base type resins such as:
Amberlite IR-120
Ionac C-20
Prolate C-100
Jonac C-270
Amberlite-200
Ionac CFS
Sybron Lewatit strong base resins
Sybron Lewatit weak base resins Generally, the strong base type I resins, particularly those based on polystyrene backbones, give good overall results removing perchlorate and/or other oxyanions and are preferred.

Among these resins, excellent results have been attained using the Resintech SIR-100 and Purolite A-520-E resins.

The Perchlorate/Oxyanion-Destroying Microbes

This invention employs a perchlorate/oxyanion-destroying microbial fluid product. The microbial fluid product may be based upon an enrichment culture or a pure culture of perchlorate/oxyanion-reducing microbes. It may be a fluid suspension of the microbes in particulate form or it may be a fluid supernatant or fluid filtrate isolated from the suspended microbes.

In one of the improvements of this invention, this microbial fluid product is the product of an enrichment culture. Microbes capable of producing a fluid product which can break down perchlorate to nonperchlorate species and/or break down other oxyanions are ubiquitous in the environment and have been isolated from a variety of perchlorate-contaminated environments. For the purposes of this invention, more typically an enrichment culture would be used because of the difficulty in maintaining a pure culture in large-scale applications. An enrichment culture consists of a mixture of microbes enriched from a seed sample taken from a perchlorate-laden environment such as from perchlorate-contaminated rivers, lakes, wastewater effluents, pathogen-free sludges, brewery sludge, soils, etc. The seed sample is then systematically supplemented with needed nutrients and an electron donor (e.g. a carbon source) and incubated under anaerobic conditions in the presence of perchlorate and/or other oxyanions sought to be preferentially destroyed by the microbial fluid product.

Under anaerobic conditions, oxygen, an electron acceptor typically preferred to perchlorate, is not available. Culturing in the presence of perchlorate and/or other oxyanions and the absence of oxygen results in the death of microbes that cannot utilize perchlorate and the survival of those that can utilize perchlorate and/or other oxyanions. With time, as the culture renews itself under these conditions, it becomes enriched with microbes that can use perchlorate and/or other oxyanions as an electron acceptor. The resulting enriched culture can then be used as one of the improvements provided by this invention.

Preferred microbial fluid products for use in the improved processes of this invention may be based on pure or enriched bacterial cultures obtained from perchlorate-containing municipal wastewater sludge (see U.S. Pat. No. 3,755,156 (1973), pure or enriched cultures obtained from perchlorate-containing activated sludge including *Dichlorosoma* strain GR-1 isolated from or enriched in activated sludge (see Rikken, G. B, et al. *Appl. Microbial. Biotechnol.* (1996) 45:420); and the BALI_culture taken from Clark County, Nevada waste water treatment plants in purified or enriched form (see Gingras, T. and J. Batista,. *J. Environ. Monit.* (2002) 4:96-101; *Dechloromonas agitata* strain CKB from paper mill waste (see Bruce, R. A, et al. *Environ. Microbial.* (1999) 1:319) as well as microbial products containing one or more of the following materials all in pure or enriched form:

α, β, and γ subclasses of proteobacteria (see Rikken, *Applied Micro Technology*. (1996) 45:420-426, and Coates et al., (1999) *Applied Env. Microbi.* (1999) 65:5234-5241);

*Dechloromonas agitata; Dechloromonas* SUIL; *Dechloromonas* Miss; *Dechloromonas* NM; *Dechloromonas* JM; *Dechloromonas* HZ; *Dechloromonas* JDS5 (see Coates et al. *Applied Env. Microbi.* (1999) 65:5234-5241; and Kesterson, K. (2005) UNLV Dissertation);

*Dichlorosoma suillum; Dichlorosoma* PS, *Dichlorosoma* SDGM; *Dichlorosoma* KJ; *Dichlorosoma* GR-1; *Dichlorosoma* PDX; *Dichlorosomaperc lace* (see Coates et al. *Applied Env. Microbi.* (1999) 65:5234-5241); *Dechlorosoma* strains PPA, *Dechlorosoma* D8, *Dechlorosoma* KJ; *Dechlorosoma* KJ3, and *Dechlorosoma* KJ4 (see B. E. Logan *Appl. Environ. Microbial.* (2001) 67:2499);

*Pseudomonas stenotrophomonas;*
*Vibrio dechloraticans Cuznesove B*-1168;,
*Wohinella succinogenes* HAP-1 of U.S. Pat. No. 5,302,285;
*Ideonella dechloratans*; and
*Acinetobacter thermotoleranticus.*

These are preferred representatives of the types of microbes that can be enriched and used in the presently improved process.

These microorganisms can grow on a variety of electron donors while effectively reducing perchlorate/oxyanions in aqueous medium in the presence of suitable nutrients. Electron donors include hydrogen and carbon sources such as acetate, ethanol, methanol, volatile fatty acids, proteins, lactate, vegetable oil, isopropanol, sugars and sugar sources such as corn syrup and the like (see Romanenko et al. (1976) *Mikrobiologya*, 45:204-209, Coates et al., (1999) *Bioremediation Journal*, 3:323-334, Attaway and Smith (1993) *Journal of Indust. Microbiology* 12:408-412, Hunter, W. (2002), *Current Microbiology*, 45:287-292, Zhang et al., (2002), *Environ. Microbiology*, 4:570-576), Shrout et al., (2004), *Applied Microbial and Cell Physiology*, 10:1-16).

Representative Loaded Resins and Water-based Feedstocks

The resins that are treated with the perchlorate/oxyanion-destroying microbial fluid products are resins which have become partially loaded to relatively completely loaded with perchlorate and optionally other oxyanions relative to their perchlorate/oxyanions-absorbing capacity. In most settings, it is desirable to remove perchlorate quite completely. Often as a resin becomes partially exhausted on an absolute scale its performance drops off. This can be signal to consider to consider it "exhausted" and to remove it from service. This can occur when as little as 20-40% of the total available resin capacity has been used up. For most drinking water applications, about 3-5% of the resin capacity may become occupied by perchlorate. Nitrate is another oxyanion that is almost always present as well and almost always in absolute amounts much greater than perchlorate. Thus, when 3-5% of the available sites are occupied by perchlorate, about 20-40% of the resin capacity will generally be occupied by nitrate. This will be seen in the present examples where resins were deemed suitable for regeneration when about 20-50% of their total capacity was exhausted. These resins can become loaded in service in an ion exchange-based water purification unit. The term "water purification" is used in a broad sense to include the purification of not only ground water, surface run off, water found in bodies of water, streams, rivers and the like drinking water source but also to include commercial, industrial and agricultural water sources such as plant effluents, agrarian run offs, sewage and the like.

In all of these settings, the water being purified contains an unacceptably high level of perchlorate and optionally other oxyanions. In the case of perchlorate, this is a level of perchlorate ion greater than a few parts per billion. There is no upper limit to the amount of perchlorate in the water. This feed water can contain up to parts per million of perchlorate and in some industrial settings can contain tens or even up to 100 parts per million of perchlorate. It will be appreciated that the improvements of this invention would work with resins loaded by treating water with even higher perchlorate contents. In all of these settings, it is very likely, if not the rule, that there will be other secondary oxyanions which will be picked up by the ion exchange resin. Many of these ions such as sulfate and nitrate, while not as troublesome as perchlorate, are not particularly desirable in drinking water so their exchange onto the resin is generally welcomed. Utilizing the improvements of this invention, nitrate, if present on the resin, may also be reduced biologically to harmless nitrogen gas with many of the microorganisms called for herein. These secondary oxyanions are typically present at levels considerably higher, often by factors of a thousand or more, than perchlorate. A representative feed water of this type could contain from about 10 to 250 ppb of perchlorate, and 1 to 100 ppm of nitrate and/or sulfate. Other secondary ions such as heavy metal-based oxyanions for example arsenate may also be present in amounts of from about 10 ppb to 100 ppm and when present are also regularly removed from the feed water when it is contacted with the resin. Thus, as noted above, a loaded resin bed may be substantially loaded with perchlorate ions in some cases but more typically may have secondary ions as its predominant load.

In one special setting, the feedstock streams subjected to purification by contact with the resin and from which the perchlorate/oxyanion load on the resin originates are themselves formed in an ion exchange process. For example they can be the perchlorate/oxyanion-containing rinse water and aqueous brines generated during regeneration of perchlorate/oxyanion loaded ion exchange resins. In this setting the perchlorate-laden brines and/or rinse waters generated in the regeneration of a first resin are contacted with a second resin suitable for selectively absorbing the perchlorate/oxyanion load. This leads to the second resin removing (and becoming loaded with) the perchlorate/oxyanions. This loaded second resin is then treated in accord with this invention to degrade and remove its perchlorate load.

While perchlorate is one of the most readily absorbed ions and can displace other species absorbed onto the resin such as nitrate and sulfate, in practice the ion exchange resin is commonly sent to regeneration or disposal once it is loaded with perchlorate and secondary ions exchanged out of the feed stream. Therefore, a typical resin to be bioregenerated using the improvements of this invention will generally contain perchlorate and these secondary oxyanions.

Overall Process Descriptions and Process Flows

FIG. 1 shows a representative apparatus for contacting the resin with the microorganisms. Perchlorate/oxyanion-loaded resin 8 is present in vessel 10. There are two modes of operation. In one mode the loaded resin is formed in a water purification unit (not shown) and is removed from that unit and loaded into vessel 10 specifically for regeneration. Alternatively, vessel 10 can be part of the water purification unit and the loading of its resin with perchlorate/oxyanion contaminants from water sources and the regeneration can be carried out in situ in vessel 10 without removing the resin. This second mode of operation can be carried out in vessel 10 by initially charging fresh resin to the vessel and loading it with perchlorate/oxyanion by passing perchlorate/oxyanion-laden untreated water over it via line 4. The resin will absorb the perchlorate/oxyanion in exchange for a nonperchlorate/oxyanion ion (usually chloride) present on the resin and yield perchlorate/oxyanion-free treated water which can be removed via line 6. This loading is what happens when the resin is in service purifying water.

The loaded resin is then treated to biologically break down and remove perchlorate/oxyanion load A microbial fluid product, based upon a pure or enriched culture of perchlorate/oxyanion destroying microorganisms, and preferably one or more of the preferred microorganisms enumerated hereinabove, microbial nutrients and one or more electron donors are charged to vessel 12 via line 14 and slowly mixed via mixer 30 to maintain the microbes in suspension and prevent stratification. Once the microbial culture is deemed stable, this biomixture is fed through line 16 to vessel 10 where it contacts resin 8 and biologically reduces the perchlorate present in resin 8. The two vessels are kept closed to maintain anaerobic conditions. The anaerobic conditions coupled with the presence of perchlorate will lead to enrichment of the desired perchlorate-consuming microorganisms. The two reactors are preferably maintained at a temperature in the range of 5° C. to 30° C. by means of a heater or cooler or other form of heat exchanger, shown in this figure as heat exchanger loop 31. Most commonly, a continuous flow of biomixture from vessel 12 to vessel 10 via line 16 and back to vessel 12 via line 18/18A is maintained during the biodegradation of perchlorate and other oxyanions As the microorganism-liquid product utilizes the electron donor, the nutrients and perchlorate and often other oxyanions, biomass is generated that is carried off from vessel 10 via line 18 and 18A back to vessel 12. Wasting of biomass from vessel 12 can be accomplished via line 20. Typically, some sort of biomass solid/biomixture fluid separator is provided to assist in the preferential wasting of biomass. This could take the form of a zone in the bottom of either of vessels 10 or 12 into which the biomass could settle and from which it could be removed. It could also be a solid/liquid separator 19, located in line 18 (or line 16, or line 20) into which a flow of biomixture plus biomass is fed, such as via line 18. A flow having a reduced biomass content is removed from separator 19 via line 18A and returned to the biodegradation circulation loop. Biomass is separated from the mixture and wasted such as though line 21.

Figure 5:
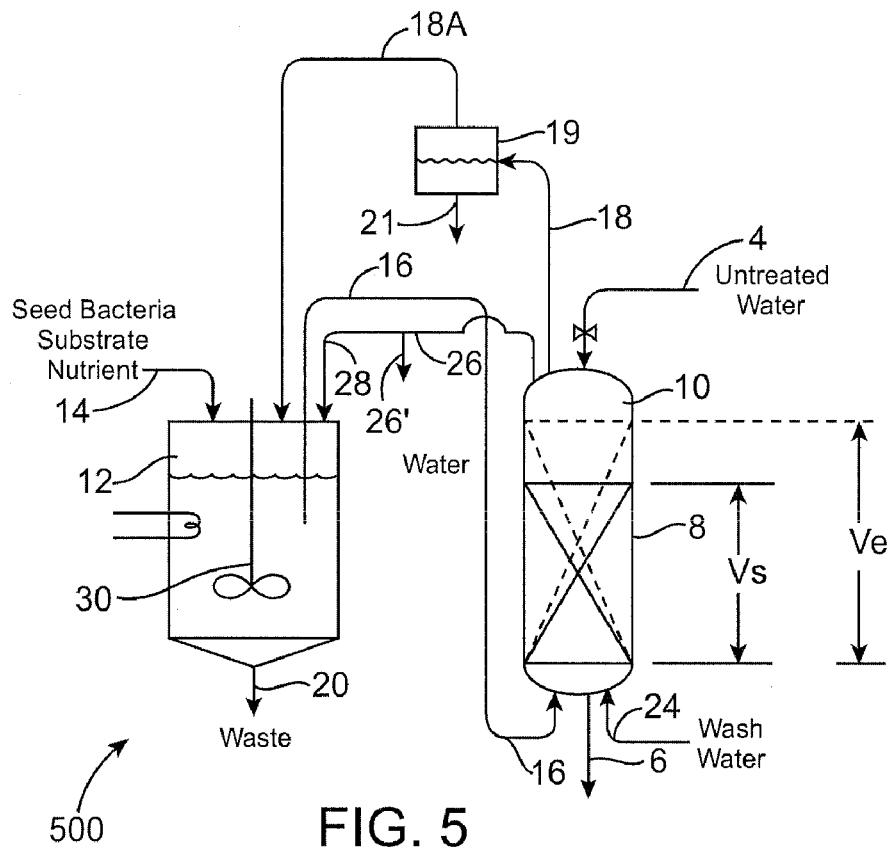

The process depicted in FIG. 1 has the flow of biomixture passing downflow over the bed or resin being regenerated. FIG. 5 shows the alternative process flow where the flow of biomixture is upflow through the resin as is preferred.

Following bioregeneration, the resin in bed 8 can be rinsed, concurrently or counter currently, with water supplied, for example, upflow via line 24 or downflow via line 25. Residual biomass, and biomixture on the resin will be removed by this rinsing and can be carried away from vessel 10 with the used rinse water via line 26 or line 22 or recycled via line 18 or 28, depending upon the direction of flow of the rinse water. This rinsing generally is continued until there has been essentially complete removal of the microorganisms from the bed of regenerated resin. Additional clean-up steps such as acid rinsing, hot water treatment and the like can be applied to the regenerated resin, either in place (in vessel 10) or in other process equipment not shown.

In addition, the bioregenerated resin can be subjected to a brine regeneration/refreshment step, typically with a sodium chloride brine. This will have the effect of displacing residual products of the biodegradation of the perchlorate/oxyanion species as well as displacing miscellaneous other ionic species such as sulfate which have become absorbed onto the resin 8. It will convert most, if not all, of the active sites present on the bioregenerated resin to a uniform chloride form. This brine treatment will typically be followed by a water rinsing. This brine treatment can be carried out in a variety of manners including without limitation the methods set forth in U.S. Pat. No. 6,878,286 which can be used when vessel 10 and bed 8 are one of a plurality of vessels and resin beds being used in a multivessel process for removing water contaminants.

Figure 2:
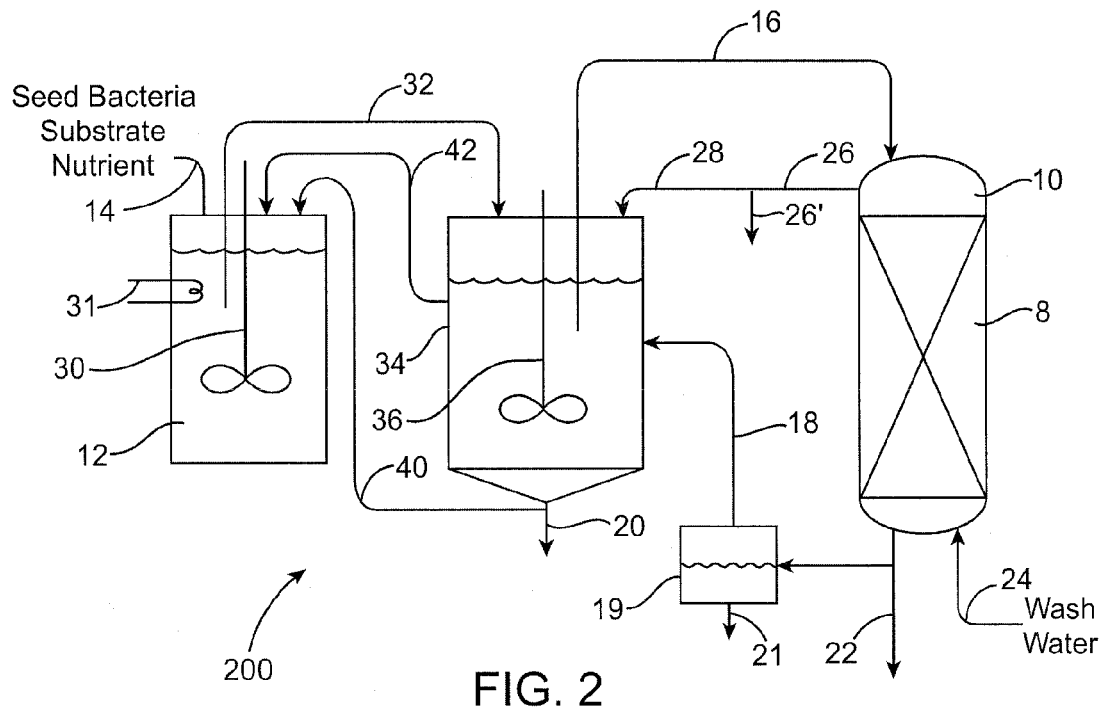

FIG. 2 shows a variation on the general process depicted in FIG. 1. The same numbers will be applied to the same equipment, when applicable. FIG. 2 depicts system 200 in which the perchlorate-destroying microorganisms are cultured in a two stage reactor/separator. A suspension of perchlorate/oxyanion-degrading microorganisms (as described in reference to FIG. 1), electron donor and needed nutrients are again added via line 14 to vessel 12. Vessel 12 is equipped with mixer 30 and heat controller 31, to hold the temperature of the fluid flowing through the system at a constant temperature in the range of 5° C. to 30° C. Once the microbial culture is stable, it is passed via line 32 to separator/settler 34 to assist in the settling of biomass solids from the culture and achievement of a substantially biomass-solids-free supernatant microbial fluid product.

This biomass-solids-free microbial fluid product, which may contain the perchlorate/oxyanion-destroying microorganisms in suspension, is drawn off and transferred via line 16 to vessel 10 which contains a bed 8 of perchlorate/oxyanion-loaded ion exchange resin. The microbial fluid product bioreacts with the perchlorate/oxyanion load on the ion exchange resin in bed 8 converting the perchlorate/oxyanion load to nonperchlorate species and the like which are not so tightly bound to the resin. The microbial fluid product flows though bed 8 as a continuous flow and is recycled via line 18 to vessel 34 or alternatively to vessel 12. Vessels 10, 12 and 34 are operated at anaerobic conditions to enrich the perchlorate-digesting microorganisms.

This bioreaction in vessel 10 generates biomass which is carried off with the flow of microbial fluid product via line 18 and returned to vessel 34 (or alternatively vessel 12). In either flow scheme, usually at least a portion of this biomass will be separated from the remainder of the fluid product in settler 34 prior to recirculating the microbial fluid product over resin bed 8 in vessel 10. Biomass can be removed from settler 34 via line 20 and optionally recycled to bioreactor 12 via line 40 or via separate separator 19 and line 21. Supernatant, separated in settler 34, can also be recycled to bioreactor 12 via line 42 for refreshment.

Figure 6:
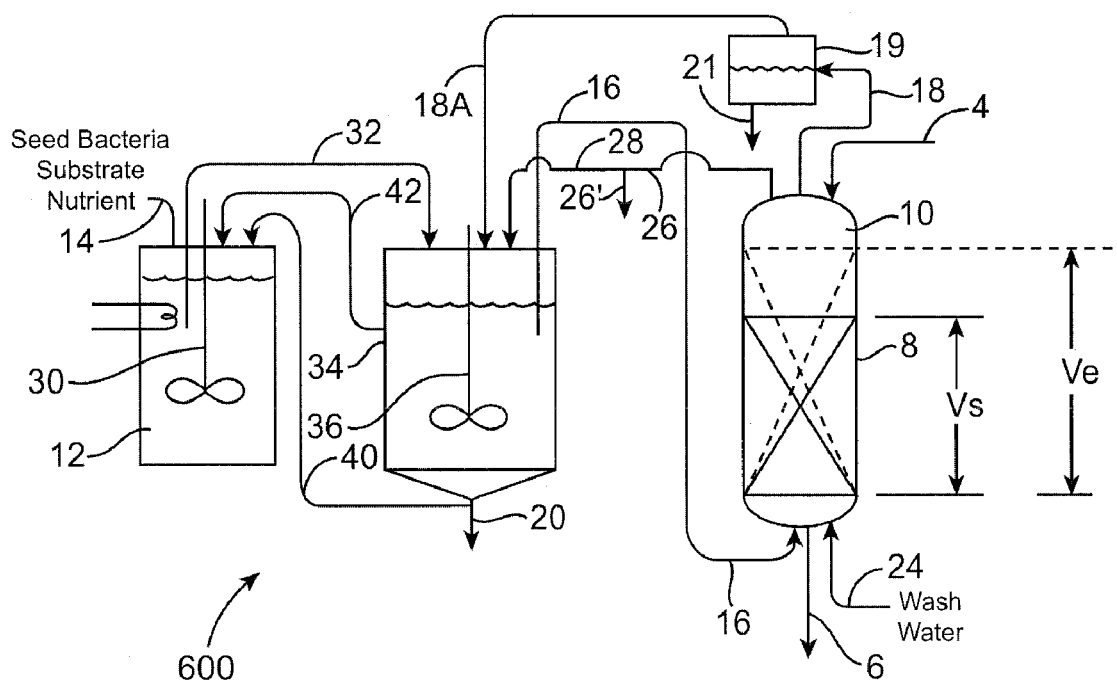

Wash water can be fed over the regenerated resin via lines 24 and 26 and can be removed to waste via line 26 or in the case of rinse water, fed through line 28 to vessel 34 or vessel 12 as make up water. At this time, if the ion exchange resin is to be returned to service, it is generally advantageous to contact the resin with a brine solution the convert the sites on the resin to a uniform chloride form. As was noted in the description of FIG. 1, while this figure shows the fluid microbial product flowing downflow over the bed of resin 8, there are advantages to having this flow be upflow through the resin bed, and such a flow is generally preferred. This upflow flow scheme is shown in FIG. 6.

Figure 3:
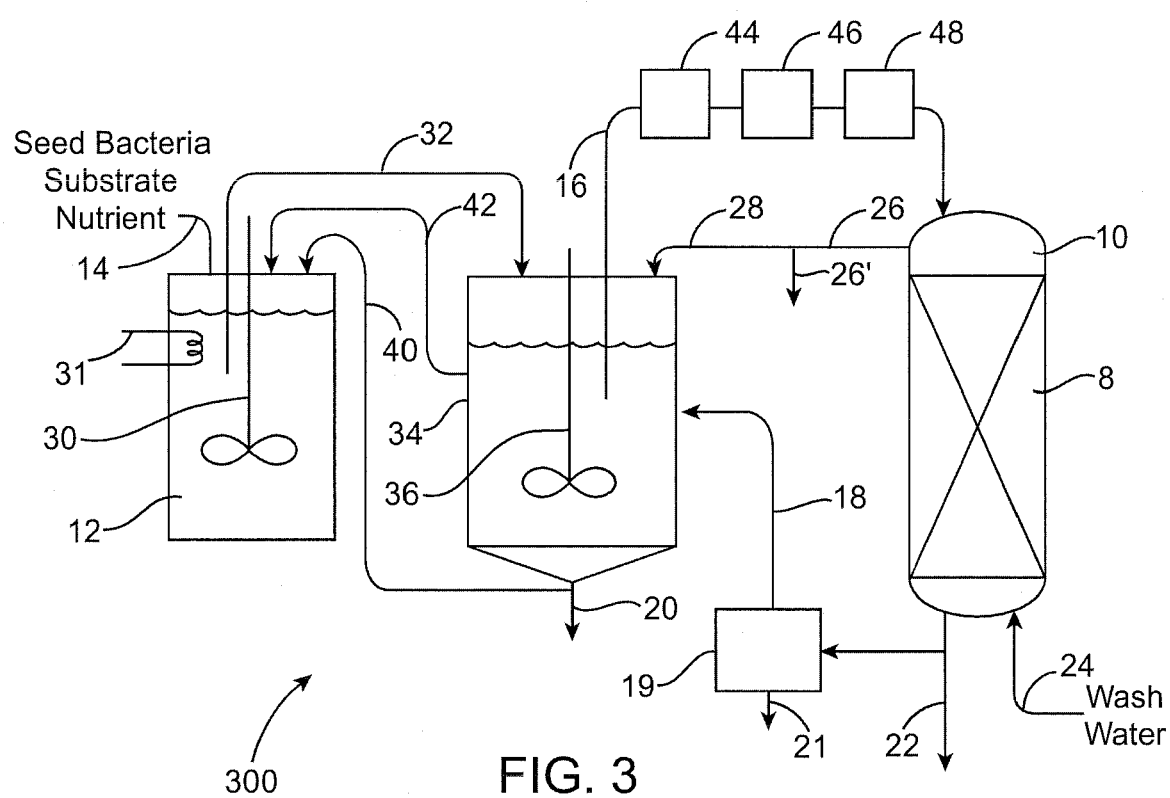

Now turning to FIG. 3, system 300 is shown. System 300 is identical to system 200, just described, except that it includes three optional additions incorporated into line 16 to modify or treat the enriched microbial liquid product being passed via line 16 into contact with the perchlorate-loaded resin present in bed 8. (Those parts of system 300 described in reference to systems 100 or 200 will not be revisited here.) These optional additions include a filter 44.

Filter 44 is a filter designed to retain solids present in the liquid product. This is nominally a 15 micron to 100 micron particle retention filter and more typically a 20 to 50 micron particle retention filter. We have used a nominal 25 micron particle retention filter in our work and find it to provide good results. Filter 44 can be used to reduce the microorganism particles as well as any particulate sludge or biomass in the product water. This can be important if the product water, line 22, is to be used as potable water.

System 300 also optionally contains ion exchanger 46. This is an in-line ion exchanger filled with a perchlorate-selective ion exchange resin. It is generally desired to reduce the level of perchlorate on the resin in bed 8 to as low a level as possible. It is to be understood that the perchlorate ions absorbed onto resin 8 are to a modest extent in an equilibrium with nonsorbed ions such that as liquid is flowing over the resin in bed 8, some small, but detectable, amounts of perchlorate dissociate from the resin and enter the liquid flowing past. This ion exchanger 46, with its perchlorate-selective resin, eliminates the chance that this desorbed perchlorate is reabsorbed onto the resin in bed 8.

System 300 can employ the temperature control and enriched liquid microorganism products as already discussed.

System 300 can also include a bed of activated carbon in in-line filter 48 This carbon bed can remove odors and prevent their build up.

Figure 4:
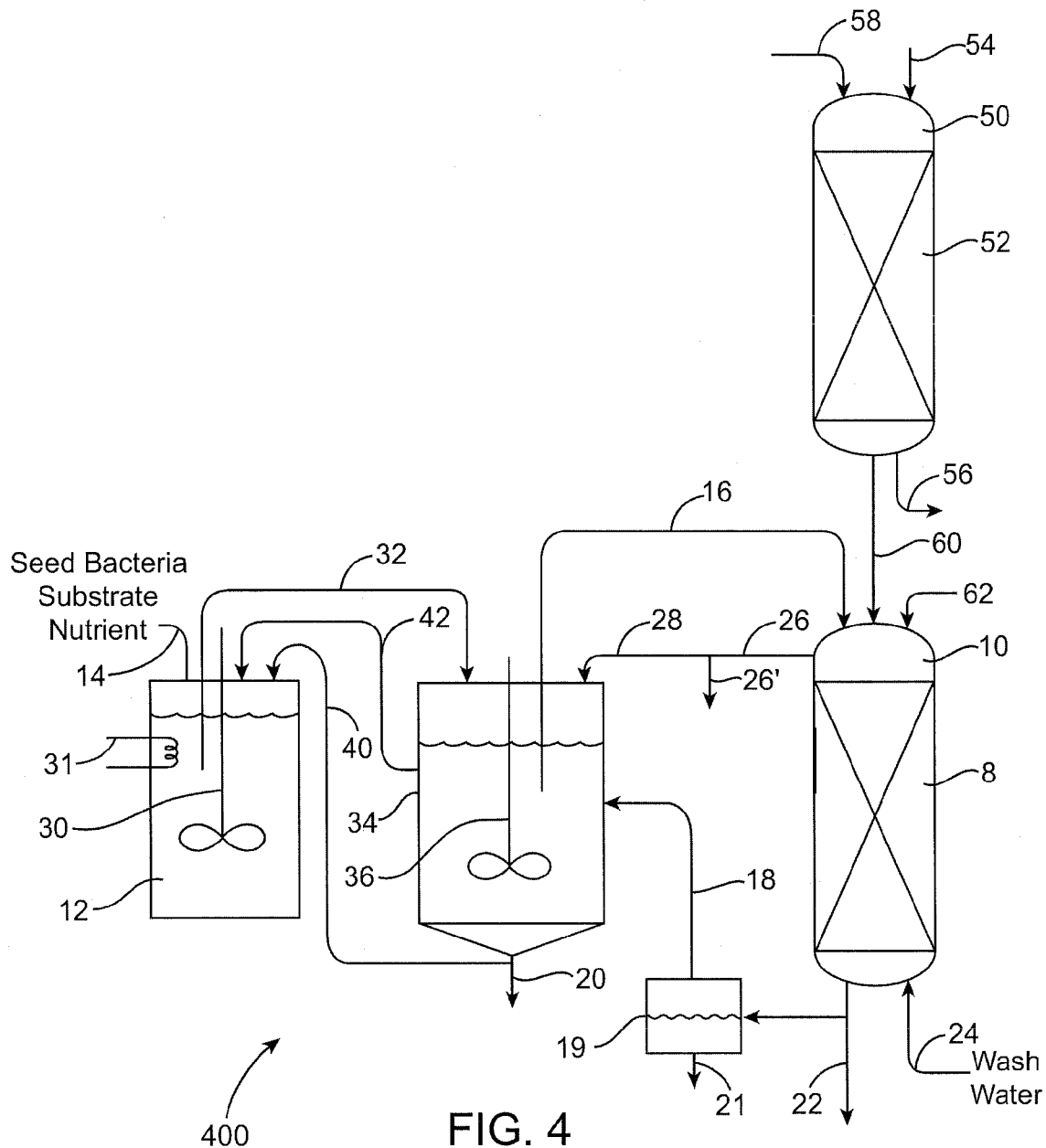

FIG. 4 shows system 400. System 400 includes ion exchange vessel 50 loaded with resin bed 52. Resin bed 52 is a typical spent resin bed from use in perchlorate removal duty. Its resin contains a mixture of nitrate and sulfate ions absorbed on its resin in addition to perchlorate. These ions would have been present in feed water fed over the resin via line 54. Product water, containing reduced levels of perchlorate, nitrate and sulfate ions, is removed via line 56. To regenerate the spent resin, a brine solution, typically containing on the order of 4-8% or more by weight sodium chloride, is fed via line 58 and passed over resin bed 52 where it displaces the perchlorate, nitrate and sulfate ions present on the spent resin. The waste brine from vessel 50, which contains perchlorate, nitrate and sulfate ions, is transferred via line 60 to vessel 10 which contains a perchlorate-selective resin as bed 8. This resin bed absorbs the perchlorate onto the resin in bed 8 and yields a relatively perchlorate-free but nitrate and sulfate-rich effluent out of vessel 10. This effluent is removed via line 22, most typically for discard/disposal into a commercial brine disposal line or well. This is advantageous in that the untreated brine stream with its substantial perchlorate concentration can not be fed into typical commercial brine disposal lines and wells.

Once the resin bed 8 is loaded with perchlorate, the flow of brine is stopped, rinse water is passed over the resin via line 62 to removal via line 22. This removal of brine is often needed to prevent the high salt level from deactivating the microorganisms which are next fed over the resin bed 8. Once the bed 8 has been rinsed, the microbial culture liquid product is fed via line 16 from separator 34 and the process described with reference to FIG. 2 is carried out to permit the perchlorate load on the resin in bed 8 to be reacted to nonperchlorate products.

In the process depicted with reference to system 400, it will be noted that perchlorate was separated from nitrate and sulfate by desorbing and eluting all of the three ions simultaneously off of resin bed 52 with brine. Thereafter resin selectivity was relied upon to preferentially absorb the perchlorate content from the brine. In a variation on this, the three ions can be absorbed onto the resin bed 8 in vessel 10 from a perchlorate, nitrate and sulfate- contaminated water source substantially as depicted in FIG. 2. The perchlorate can be reduced using the microbial culture and thereafter, once the perchlorate level has been suitably reduced to a level that any residual perchlorate will not be a disposal issue, the bed of resin 8 in reactor 10 which will then still contain substantial levels of nitrate and sulfate can be treated with brine to desorb the nitrate and sulfate and minor amounts of perchlorate remaining on the resin. The loaded brine, so formed, will have minimal perchlorate content and can be discarded by routine channels.

FIG. 5 shows a representative system 500 for contacting the resin with the microorganism liquid product with the flow of the microorganism liquid being upflow through the bed. The description of those sections of system 500 which are identical to system 100 are not repeated. It will be noted that in system 500 vessel 10 contains a static volume of resin 8 depicted as volume Vs. Microbial liquid is fed upflow through bed 8 thereby expanding the volume o the bed to Ve. Ve represents an expansion of bed volume of at least about 20%, preferably from about 25% to about 200% and more preferably 40% to 70%. Spent microorganism liquid regenerant is taken off out the top of vessel 10 via line 18 where it is optionally passed through separator 19 to provide a liquid phase 18 which is returned to vessel 12 via line 18A. Solids present in the used regenerant stream such as biomass are removed via line 21.

FIG. 6 shows a variation on the general process depicted in FIGS. 2 and 5 in which, again, the flow of microorganism liquid product is upflow through the resin bed 8 in vessel 10 via line 16 and causes bed 8 to expand from Vs to Ve.

Process Conditions

Contacting the resin with the microbial fluid product is carried out in batch or continuous mode. The amount of microorganism fluid product passed through the resin is to be in part determined by the load of perchlorate and other oxyanions present in the resin and by the microorganism's specific growth rate in that it is desired to have an excess of the microorganism fluid product as compared to the load of perchlorate and other oxyanions being broken down. One way to define the amount of fluid microbial product to be used is to provide the product at the flow rates set forth herein and to have the amounts of solid biomass being generated and removed be such that the average solids retention time (SRT) for the solid biomass is from about 5 to abut 50 days, and especially from about 8 to about 40 days.

Contacting is carried out for a prolonged period of time, such as at least about three days and up to about four weeks, and more commonly from about five days to about two weeks. The extent of conversion can be monitored and conversion of essentially all the perchlorate contamination can be achieved. The contacting can be conducted at any temperature at which the microorganisms retain viability, such as from about 5° C. to about 30° C. and especially about 15° C. to about 30° C. and is preferably controlled in this range. The ideal pH is around neutral. However, pHs varying from 6-9 are acceptable.

The influent microbial culture should not contain large amounts of dissolved oxygen to maintain an anaerobic condition in which the microorganisms can flourish and degrade perchlorate. From time to time, backwashing will remove any excess microorganism build up from the resin bioregeneration vessel.

While the process can, in theory be carried out in a static mode, better results are generally achieved when the microorganism fluid product is fed upflow over the perchlorate-loaded resin with the resin bed expanded 40-70%. Representative flow rates to obtain the aforementioned expansions vary from about one volume of flow per volume of resin per hour to about 1000 volumes per volume per hour and especially from about fifty volumes/hr. to about 500 volumes/hr.

The present invention will be further described by the following examples. These are provided solely to illustrate the practice of this invention and are not to be construed as limitations on its scope:

EXAMPLE 1

Bench Scale Tests

A microbial culture fluid was developed by seeding 18 L of buffer/mineral media with 500 ml of perchlorate-degrading enrichment culture. The enrichment culture was prepared by selectively aerobically culturing water samples taken from a site heavily contaminated with perchlorate. A ten gallon covered polyethylene tank with a conic bottom was used as the reactor vessel for producing the microbial culture. The reactor was fitted with a mixer that rotated at about 20 rpm. Anaerobic conditions in the reactor were established by covering the reactor and sealing the cover with tape. The solids retention time (SRT) used in operating the reactor was approximately 27 days. After the microbial culture was deemed stable, the bioregeneration tests were started. The microbial fluid product reactor vessel contained the perchlorate-reducing microorganisms and a mineral/nutrient broth that provided an electron donor (i.e. acetate), and buffer solution to keep the pH at 7.0.

The spent resin vessel contained resin loaded with perchlorate at 3% its total capacity. The system was operated continuously in a recirculating mode by pumping filtered fluid microbial product from the microbial fluid reactor vessel in upflow contact with the spent resin beads and returning the fluid back to the reactor vessel. The microbial fluid product reacted with the perchlorate contained in the resin beads and converted it to nonperchlorate species. Periodically, small samples of spent resin were taken from ports in the wall of the vessel. The resin samples were then eluted and the eluent was analyzed for perchlorate to determine the remaining perchlorate concentration.

Figure 7:
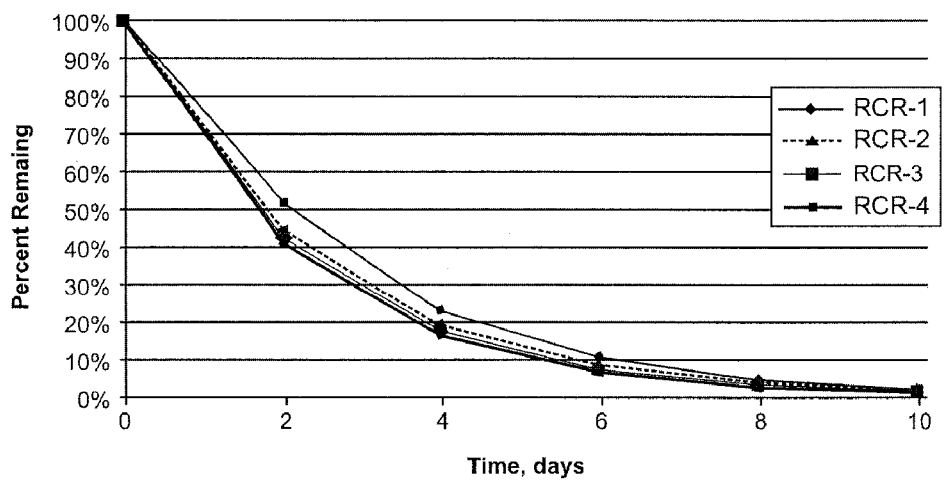

FIG. 7 shows perchlorate bioregeneration results for resin loaded with perchlorate at 3% of its capacity. Notice that after two days of operation, about 40-50% of the perchlorate remained in the resin. After four days of operation, only about 20% of the perchlorate was remaining. After about ten days of operation, all the perchlorate was biodegraded.

The results shown in FIG. 7 confirm that is possible to regenerate resin beads biologically rather than using a salt brine This process: (a) converts perchlorate to innocuous chloride, removing the contaminant from the environment and thereby eliminating the risk of recontamination, (b) eliminates the need to use brine solutions to regenerate the resins, (c) and allows for the reuse of resin.

This regeneration was repeated three times with minor variations. The results of all four runs are shown on FIG. 7. The resin employed was Resintech SIR-100. Runs RCR-1 and RCR-2 were carried out with 3 mg/l of perchlorate on the resin and a flow rate of regenerant of 320 ml/minute. At the reactor size employed this resulted in an average empty bed liquid residence time in the reactor of 0.41 minutes. Run RCR-3 was carried out with 3 mg/ml loading of a mixture of nitrate and perchlorate and a flow rate which yielded an empty bed residence time of 0.39 minutes. Run RCR-4 was carried out at a flow rate which yielded a residence time of 0.48 minutes. pH was maintained at 7.5-7.9. As FIG. 7 makes clear, at all of these conditions the bioregeneration consumed essentially all of the perchlorate present on the resin.

Figure 8:
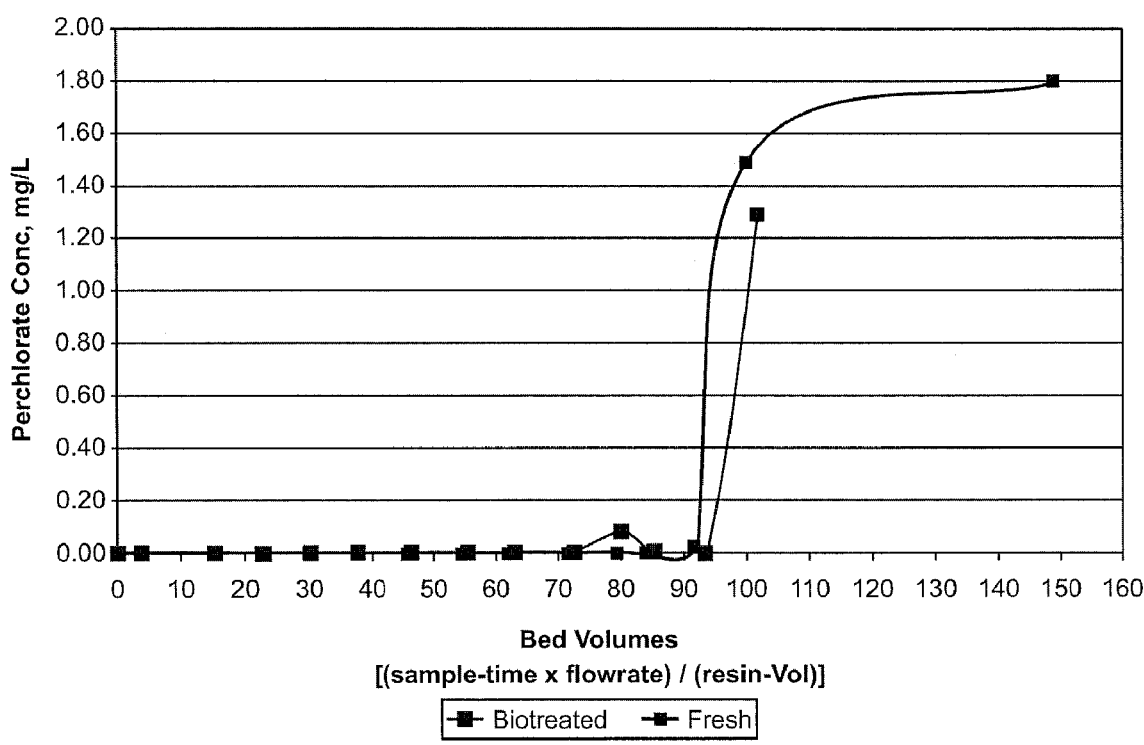

One factor to be considered in any regeneration scheme is the capacity of the regenerated resin as compared to fresh resin. The present regeneration scheme does achieve excellent retention of capacity. Samples of fresh SIR-100 resin and a sample of resin regenerated as in this example were contacted in columns with a flow of a solution containing a part per million level concentration of perchlorate. The concentration of perchlorate exiting the column was monitored. As can be seen in FIG. 8, the two samples gave virtually identical capacities to break though −0.393 meq/ml for fresh resin and 0.383 meq/ml for regenerated resin.

EXAMPLE 2

Effect of Flow Rate on Biodegradation Rate and Resin Expansion

Figure 9:
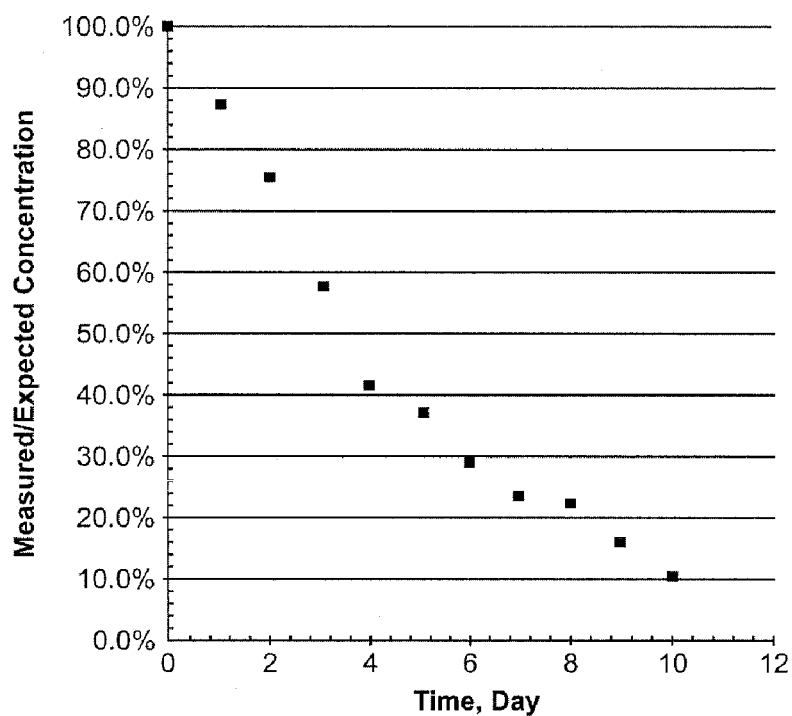
Figure 10:
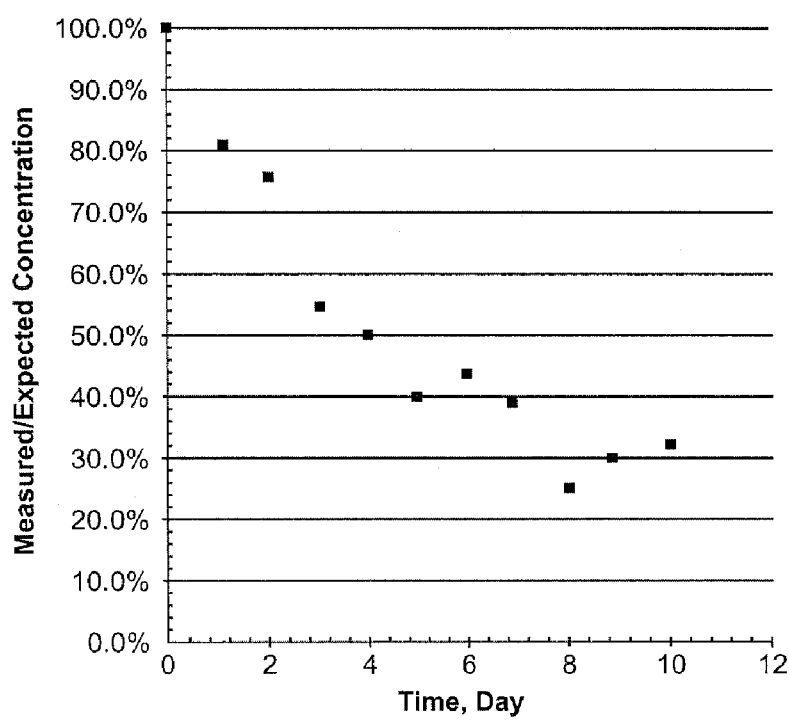

FIGS. 9 and 10 depict bioregeneration of a spent resin in the laboratory scale apparatus of Example 1 using flow rates of 335 mL/min and 213 mL/min. These flow rates correspond to retention times of 0.30 and 0.47 minutes, respectively. With the faster flow rate more complete bioregeneration was obtained. Bed expansion was 56.8% with the faster flow rate and 44.5% with the slower flow rate.

Figure 11:
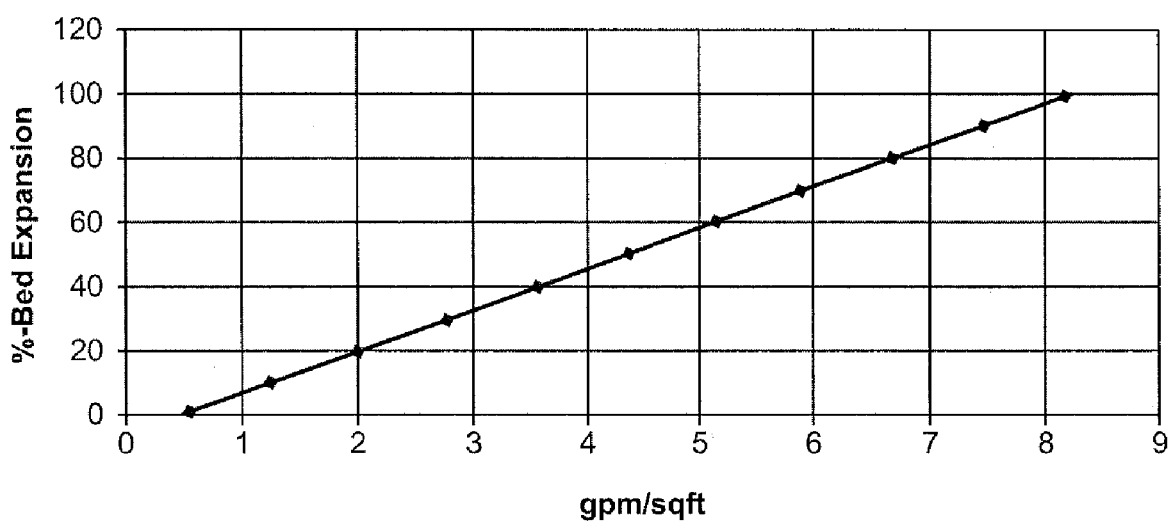

FIGS. 9 and 10 show that there exists a relationship between the flow rate applied to the system, the % expansion obtained and the kinetics of the biodegradation process. It will be readily appreciated by those of skill in the art that changes in the geometry of the bioreactor will give rise to different flow conditions being called for to attain these same degrees of bed expansion. The invention described herein is applicable to any flow conditions which give rise to the desired resin bed expansions. FIG. 11 depicts empirical data showing the extent of bed expansions (%) as a function of the hydraulic loading in the resin beads (gpm/sq ft of resin bed cross-sectional area).

EXAMPLE 3

Application to Brine Treatment and Overall Water Treatment Process

The biological removal of perchlorate from a resin using enriched cultures and expanded beds as described above can be applied to a resin that was loaded with perchlorate from a brine generated in a water treatment resin regeneration process.

Ground water containing about 20 ppb of perchlorate and part per million levels of nitrate and sulfate can be treated by passage over a bed of chloride-loaded strong base acrylic resin in an ion-exchange vessel. This treatment removes the undesired perchlorate and nitrate and sulfate anions from the water and replaces them with chloride ions. Approximately 500 to 5000 bed-volumes of water can be treated before tests of the effluent water indicate that the resin's capacity is beginning to be used up. The resin is removed from service and regenerated by contact with a strong salt brine (6-8% w NaCl). This treatment can be carried out on the resin in situ in its original bed in the ion exchange vessel. Alternatively the treatment can be carried out on the resin removed from the ion exchange vessel and placed in a resin-treatment vessel. This contact with the strong brine desorbs the perchlorate, nitrate and sulfate off of the resin. The concentration of perchlorate in the brine will be on the order of about 10 mg/L. Such a brine with this much perchlorate is considered a hazardous material and cannot be simply disposed of because of regulatory requirements. This brine, however, can be treated with a perchlorate specific resin, such as Purolite A520E resin which preferentially absorbs the perchlorate but also will typically pick up some nitrate and/or sulfate. When the perchlorate is transferred to the A520E resin, the concentration of perchlorate in the waste brine will be below detection levels and the treated brine is acceptable for disposal. The concentration of perchlorate on the A520E resin will be about 300 mg/L.

The perchlorate-loaded A520E resin can then be treated in an upflow expanded bed system with an enriched suspension of perchlorate-destroying microbial fluid to remove the perchlorate as is described above. This resin can then be recycled to treat more brine with the sodium chloride in the brine displacing any excess nitrate or sulfate and preventing the resin from becoming saturated with sulfate and nitrate which primarily remain in the brine for disposal.

What is claimed is:

1. In a method for reducing the level of perchlorate load on perchlorate-loaded ion exchange resin comprising the steps of:
   a. obtaining a perchlorate-loaded ion exchange resin, and
   b. directly contacting the perchlorate-loaded ion exchange resin with a perchlorate-destroying microbial fluid product under conditions leading to conversion of perchlorate load on the resin to nonperchlorate reaction products and generation of treated ion exchange resin having reduced perchlorate load relative to the perchlorate-loaded ion exchange resin;

the improvement comprising employing in step b. a perchlorate-destroying microbial fluid product which is based upon an enrichment culture, a pure microbial culture or an enzymatic extract of an enrichment culture or of a pure culture.

2. The method of claim 1 wherein the perchlorate-destroying microbial fluid product employed in step b. is based upon an enrichment culture or an enzymatic extract of an enrichment culture.

3. The method of claim 2 wherein the enrichment culture comprises one or more microbes enriched from perchlorate-containing materials selected from perchlorate-containing municipal wastewater sludge, perchlorate-containing activated sludge, perchlorate-containing lake water, perchlorate-containing river water, perchlorate-containing ground water, perchlorate-containing soil and perchlorate-containing paper mill waste.

4. The method of claim 1 wherein the culture comprises a material selected from the group consisting of α, β, and γ subclasses of proteobacteria;
*Dechloromonas agitata;*
*Dechloromonas* SUIL;
*Dechloromonas* Miss;
*Dechloromonas* NM;
*Dechloromonas* JM;
*Dechloromonas* HZ;
*Dechloromonas* JDS5;
*Dichlorosoma suillum;*
*Dichlorosoma* PS;
*Dichlorosoma* SDGM;
*Dichlorosoma* KJ;
*Dichlorosoma* GR-1;
*Dichlorosoma* PDX;
*Dichlorosoma perc lace;*
*Dichlorosoma* DPA;
*Dichlorosoma* D8;
*Dichlorosoma* KJ;
*Dichlorosoma* KJ4;
*Pseudomonas stenotrophomonas;*
*Vibrio dechloraticans Cuznesove* B-1168;
*Wohinella succinogenes* HAP-1;
*Ideonella dechloratans;* and
*Acinetobacter thermotoleranticus.*

5. The method of claim 1 wherein the conditions in step b. are anaerobic conditions.

6. The method of claim 4 wherein the perchlorate-destroying microbial fluid product employed in step b. is based upon an enrichment culture or an enzymatic extract of an enrichment culture.

7. The method of claim 6 wherein the conditions in step b. are anaerobic conditions.

8. In a method for reducing the level of perchlorate load on perchlorate-loaded ion exchange resin comprising the steps of:

a. obtaining perchlorate-loaded ion exchange resin, and
b. directly contacting the perchlorate-loaded ion exchange resin with a perchlorate-destroying microbial fluid product under conditions leading to conversion of perchlorate load on the resin to nonperchlorate reaction products and generation of treated ion exchange resin having reduced perchlorate load relative to the perchlorate-loaded ion exchange resin;

the improvement comprising conducting the contacting of step b. at controlled temperature in the range of from about 5° C. to about 30° C.

9. The method of claim 8 wherein the conditions in step b. are anaerobic conditions.

10. In a method for reducing the level of perchlorate load on perchlorate-loaded ion exchange resin comprising the steps of:

a. obtaining perchlorate-loaded ion exchange resin, and
b. directly contacting the perchlorate-loaded ion exchange resin with a perchlorate-destroying microbial fluid product under conditions leading to conversion of perchlorate on the resin to nonperchlorate reaction products and generation of treated ion exchange resin having reduced perchlorate load relative to the perchlorate-loaded ion exchange resin;

the improvement comprising conducting the contacting of step b. under conditions including the resin being in a bed contained in a vessel with the fluid product flowing upflow through the bed of resin.

11. The method of claim 10 wherein the upflow flow of fluid product is such as to provide expansion of the bed of resin.

12. The method of claim 11 wherein the expansion of the bed is at least about 20% expansion by volume.

13. The method of claim 12 wherein the expansion of the bed is from about 20% to about 70% by volume.

14. The method of claim 13 wherein the expansion of the bed is from about 40% to about 70% by volume.

15. The method of claim 11 wherein the contacting is carried out at controlled temperature in the range of from about 5° C. to about 30° C.

16. The method of claim 15 wherein the perchlorate-destroying microbial fluid product is based on an enriched culture of perchlorate-destroying microbes.

17. The method of claim 16 wherein the conditions in step b. are anaerobic conditions.

18. The method of claim 11 additionally comprising the step of:

c. recovering the treated ion exchange resin.

19. The method of claim 18 wherein the method is a method for safely disposing of perchlorate-loaded ion exchange resin, said method additionally comprising the step of:

d. disposing the recovered ion exchange treated resin.

20. The method of claim 16, wherein the method is a method for regenerating perchlorate-loaded ion exchange resin, said method additionally comprising the step of:

d. recycling the recovered treated ion exchange resin to a water treatment zone.

21. In a method for removing perchlorate contamination from a perchlorate-containing feed water comprising the steps of:

a. contacting the perchlorate-containing feed water with anion exchange resin having affinity for perchlorate thereby removing perchlorate from the feed water and forming a reduced-perchlorate-content product water and perchlorate-loaded ion exchange resin,
b. separating the reduced-perchlorate-content product water from the perchlorate-loaded ion exchange resin,
c. directly contacting the perchlorate-loaded ion exchange resin with a perchlorate-destroying microbial fluid product under conditions leading to conversion of perchlorate load on the resin to nonperchlorate reaction products and generation of treated ion exchange resin having reduced perchlorate load relative to the perchlorate-loaded ion exchange resin;

the improvement comprising one or more of
i. employing in step c. a perchlorate-destroying microbial fluid product which is based upon an enrichment culture, a pure microbial culture or an enzymatic extract of an enrichment culture or of a pure culture wherein the culture comprises a material selected from the group consisting of α, β, and γ subclasses of proteobacteria;
*Dechloromonas agitata;*
*Dechloromonas* SUIL;
*Dechloromonas* Miss;
*Dechloromonas* NM;
*Dechloromonas* JM;
*Dechloromonas* HZ;
*Dechloromonas* JDS5;
*Dichlorosoma suillum;*
*Dichlorosoma* PS;
*Dichlorosoma* SDGM;
*Dichlorosoma* KJ;
*Dichlorosoma* GR-I;
*Dichlorosoma* PDX;
*Dichlorosoma perc lace;*
*Dichlorosoma* DPA;
*Dichlorosoma* D8;
*Dichlorosoma* KJ;
*Dichlorosoma* KJ4;
*Pseudomonas stenotrophomonas;*
*Vibrio dechloraticans Cuznesove* B-1168;
*Wohinella succinogenes* HAP-1;
*Ideonella dechloratans*; and
*Acinetobacter thermotoleranticus,* ii. conducting the contacting of step c. at controlled temperature in the range of from about 5° C. to about 30° C., and iii. conducting the contacting of step b under conditions including the resin being in a bed contained in a vessel with the fluid product flowing upflow through the bed of resin such as to provide expansion of the bed of resin.

22. The method of claim 21 wherein the conditions in step b. are anaerobic conditions.

23. The method for removing perchlorate contamination from a perchlorate-containing feed water of claim 22 wherein the feed water additionally contains at least one of nitrate and sulfate.

24. The method of claim 22 wherein the feed water is drinking water.

25. The method of claim 22 wherein the feed water is brine.

* * * * *